US012709114B2

(12) United States Patent
Oh

(10) Patent No.: US 12,709,114 B2
(45) Date of Patent: Aug. 18, 2026

(54) VEHICLE AND METHOD OF CONTROLLING THE SAME

(71) Applicants: Hyundai Motor Company, Seoul (KR); Kia Corporation, Seoul (KR)

(72) Inventor: Hyungsuk Oh, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 628 days.

(21) Appl. No.: 17/939,111

(22) Filed: Sep. 7, 2022

(65) Prior Publication Data

US 2023/0158832 A1 May 25, 2023

(30) Foreign Application Priority Data

Nov. 24, 2021 (KR) ........................ 10-2021-0163135

(51) Int. Cl.
*B60B 25/00* (2006.01)
*B60B 19/04* (2006.01)

(52) U.S. Cl.
CPC ............ *B60B 25/002* (2013.01); *B60B 19/04* (2013.01); *B60B 2900/351* (2013.01)

(58) Field of Classification Search
CPC ....... B60B 25/002; B60B 25/22; B60B 19/04; B60B 2900/351; B60B 2900/10; B60B 2900/511; B60B 3/085; B60B 23/12; B60B 2310/306; B60W 30/18054; B60W 40/02; B60W 2556/50
USPC .................................... 701/49; 152/390, 392
See application file for complete search history.

(56) References Cited

U.S. PATENT DOCUMENTS

| | | | | |
|---|---|---|---|---|
| 3,817,580 | A * | 6/1974 | Wilson | B60B 35/1081 301/128 |
| 2015/0371541 | A1* | 12/2015 | Korman | G08G 1/147 340/932.2 |
| 2016/0200139 | A1* | 7/2016 | Cha | B60C 11/0306 152/209.1 |
| 2022/0072921 | A1* | 3/2022 | Ostrowski | B60F 1/02 |

FOREIGN PATENT DOCUMENTS

| | | | | |
|---|---|---|---|---|
| CN | 111216490 | A * | 6/2020 | B60B 19/00 |
| DE | 102014116014 | A1 * | 5/2016 | G01S 13/878 |
| JP | 2007076564 | A * | 3/2007 | |
| JP | 2009154637 | A * | 7/2009 | |
| JP | 2017085882 | A * | 5/2017 | |
| KR | 100693447 | B1 * | 3/2007 | B60B 21/00 |
| KR | 20130030655 | A | 3/2013 | |
| KR | 20130042144 | A * | 4/2013 | B60B 21/00 |

(Continued)

OTHER PUBLICATIONS

Machine Translation of JP 2007076564 A (Year: 2007).*
Machine Translation of KR 20130042144 A (Year: 2013).*

*Primary Examiner* — Ellis B. Ramirez
(74) *Attorney, Agent, or Firm* — Slater Matsil, LLP

(57) ABSTRACT

An embodiment vehicle includes a wheel having a width that is changeable and a controller configured to generate a control signal for changing the width of the wheel. The wheel includes an inner wheel connected to an axle of the vehicle, an outer wheel connected to the inner wheel, and a driver. The driver is configured to move the outer wheel along a longitudinal direction of the axle of the vehicle to change the width of the wheel by generating power in response to the control signal.

20 Claims, 12 Drawing Sheets

(56) References Cited

FOREIGN PATENT DOCUMENTS

| | | | | | |
|---|---|---|---|---|---|
| KR | 101265831 | B1 | | 5/2013 | |
| KR | 20160041116 | A | * | 4/2016 | ............. B60B 19/04 |
| KR | 20160041117 | A | * | 4/2016 | ............. B60B 19/02 |
| KR | 20180093901 | A | | 8/2018 | |
| KR | 102233477 | B1 | * | 3/2021 | |
| SU | 935320 | A1 | * | 6/1982 | |
| WO | WO-2008065407 | A1 | * | 6/2008 | ............. B60B 19/04 |

* cited by examiner

VEHICLE AND METHOD OF CONTROLLING THE SAME

CROSS-REFERENCE TO RELATED APPLICATIONS

This application claims the benefit of Korean Patent Application No. 10-2021-0163135, filed on Nov. 24, 2021, which application is hereby incorporated herein by reference.

TECHNICAL FIELD

The disclosure relates to a vehicle and method of controlling the same.

BACKGROUND

When driving, there are cases where a vehicle needs to parallel park inevitably near a boundary stone (also referred to as a curb), such as by a side of a road or next to a flowerbed. Since such parking cases are mostly insufficient in parking spaces, it is necessary to park as close as possible to the boundary stone.

In such parking environments, a driver tries to park a vehicle as close as possible to a boundary stone, but in this process, a wheel of the vehicle may come into contact with the boundary stone, so that a surface of the wheel may be damaged.

SUMMARY

The disclosure relates to a vehicle and method of controlling the same. Particular embodiments relate to a wheel structure of the vehicle and parking control using the same.

An embodiment of the disclosure provides a vehicle capable of preventing damage due to contact between a roadside structure and a wheel by varying a width of the wheel, in particular by varying so as to decrease the width of the wheel in parallel parking conditions, and a method of controlling the same.

Additional embodiments of the disclosure will be set forth in part in the description which follows and, in part, will be obvious from the description, or may be learned by practice of the disclosure.

In accordance with an embodiment of the disclosure, a vehicle includes a wheel configured to have a variable width thereof and a controller configured to generate a control signal for varying the width of the wheel, wherein the wheel includes an inner wheel connected to an axle of the vehicle, an outer wheel connected to the inner wheel, and a driver configured to move the outer wheel along a longitudinal direction of the axle of the vehicle to vary the width of the wheel by generating power in response to the control signal.

The driver may be interposed between the inner wheel and the outer wheel, and the outer wheel moves toward or away from the inner wheel along the longitudinal direction of the axle of the vehicle by the power of the driver.

A coupling member may be provided on each of the inner wheel and the outer wheel, and the inner wheel and the outer wheel may be coupled to each other through the coupling member, and the outer wheel is provided to move along the longitudinal direction of the axle of the vehicle through the coupling member.

The driver may be a hydraulic driver for generating the power in a hydraulic manner.

In accordance with another embodiment of the disclosure, a method of controlling a vehicle is provided. The vehicle includes a wheel configured to have a variable width thereof and a controller configured to generate a control signal for varying the width of the wheel, and the wheel includes an inner wheel connected to an axle of the vehicle, an outer wheel connected to the inner wheel, and a driver configured to vary the width of the wheel by generating power in response to the control signal so that the outer wheel moves along a longitudinal direction of the axle of the vehicle. The method comprises determining whether a condition for varying the width of the wheel is satisfied and generating the control signal in response to the condition for varying the width of the wheel being satisfied.

The varying of the width of the wheel may include moving the outer wheel in a direction of the inner wheel to decrease the overall width of the wheel.

In accordance with another embodiment of the disclosure, a method of controlling a vehicle is provided. The vehicle includes a wheel configured to have a variable width thereof and a controller configured to generate a control signal for varying the width of the wheel, and the wheel includes an inner wheel connected to an axle of the vehicle, an outer wheel connected to the inner wheel, and a driver configured to vary the width of the wheel by generating power in response to the control signal so that the outer wheel moves along a longitudinal direction of the axle of the vehicle. The method comprises determining whether the vehicle is in a parallel parking situation and generating the control signal so that the width of the wheel decreases in response to the vehicle being in the parallel parking situation.

The parallel parking situation may include parking the vehicle in parallel on a roadside.

The controller may be further configured to determine that the vehicle is in a parallel parking situation on the roadside when the vehicle is in a stationary state and a direction of the vehicle matches a direction of the road on which the vehicle is located.

The controller may be configured to determine that the vehicle is in a parallel parking situation on the roadside when the vehicle is in a stationary state and a location of the vehicle is on a road in a navigation of the vehicle.

The controller may be configured to determine that the vehicle is in a parallel parking situation on the roadside when the vehicle is in a stationary state and a boundary stone separating a road and a sidewalk is detected in an image of a certain area of a side of the vehicle.

In accordance with another embodiment of the disclosure, a vehicle includes a distance sensor installed on a side of the vehicle to detect a distance between the vehicle and a structure existing in a side direction of the vehicle, a wheel configured to have a variable width, and a controller configured to generate a control signal to decrease the width of the wheel in order to prevent contact between the structure and the wheel, wherein the wheel includes an inner wheel connected to an axle of the vehicle, an outer wheel connected to the inner wheel, and a driver configured to move the outer wheel along a longitudinal direction of the axle of the vehicle to reduce the width of the wheel by generating power in response to the control signal.

A plurality of distance sensors may be installed on one side of the vehicle.

The distance sensor may be installed at the lowest position of one side of the vehicle.

The distance sensor may be installed so that a direction for measuring the distance has a directivity that is directed downward more than an installation height of the distance sensor.

The driver may be interposed between the inner wheel and the outer wheel, and the outer wheel may move toward or away from the inner wheel along the longitudinal direction of the axle of the vehicle by the power of the driver.

A coupling member may be provided on each of the inner wheel and the outer wheel, and the inner wheel and the outer wheel are coupled to each other through the coupling member, and the outer wheel is provided to move along the longitudinal direction of the axle of the vehicle through the coupling member.

The driver may be a hydraulic driver for generating the power in a hydraulic manner.

BRIEF DESCRIPTION OF THE DRAWINGS

These and/or other aspects of embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
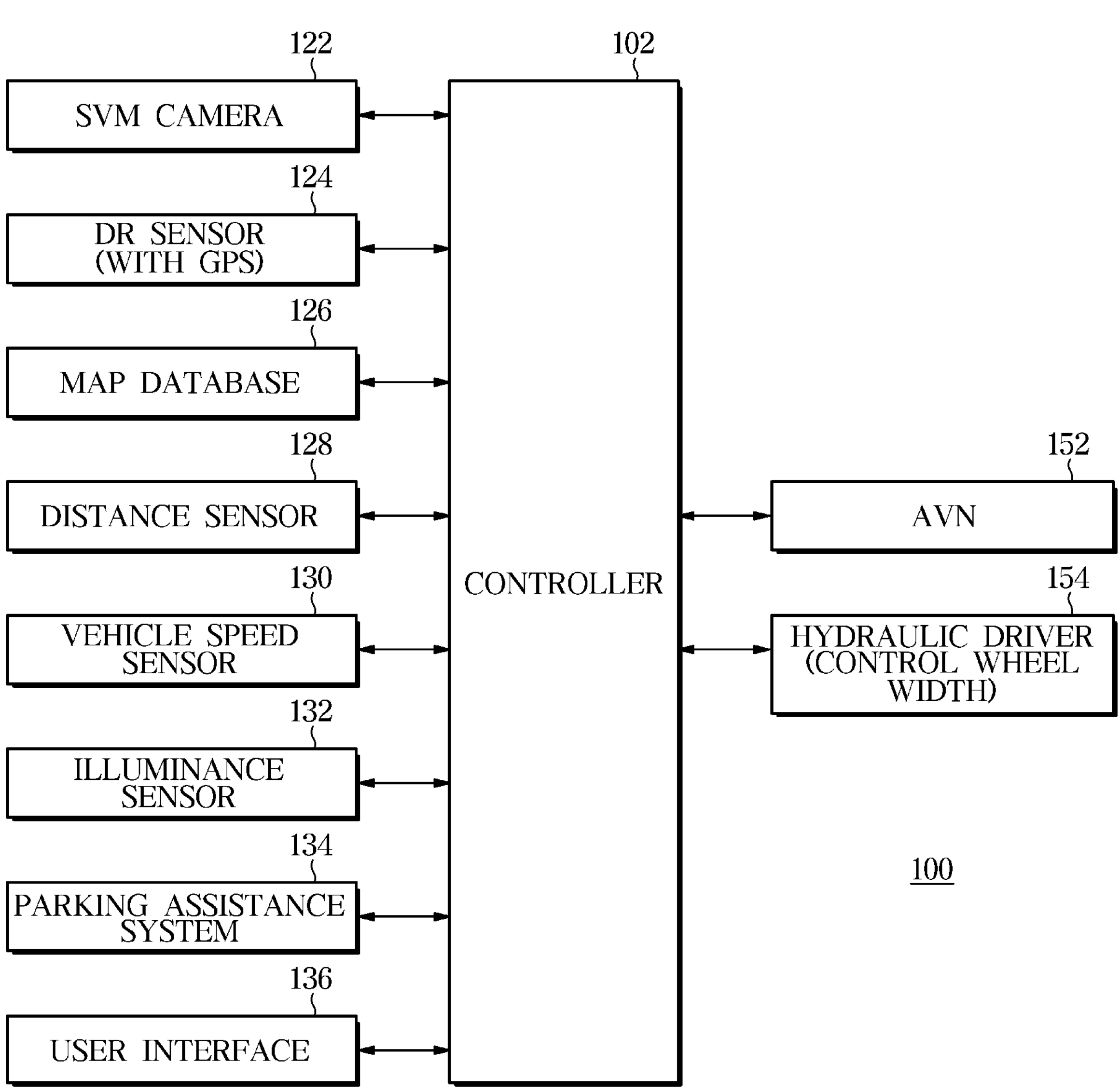
FIG. 1 is a view illustrating a control system of a vehicle according to an embodiment of the disclosure.

Like reference numerals refer to like elements throughout. The disclosure does not describe all elements of the embodiments or overlaps between the general contents or the embodiments in the technical field to which the disclosure belongs. This specification does not describe all elements of the exemplary embodiments of the disclosure and detailed descriptions on what are well known in the art or redundant descriptions on substantially the same configurations may be omitted. The terms 'part, module, member, block' used in the specification may be implemented in software or hardware, and a plurality of 'parts, modules, members, blocks' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

Furthermore, when a part is said to "include" a certain component, this means that it may further include other components, not to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the disclosure.

FIG. 1 is a view illustrating a control system of a vehicle according to an embodiment of the disclosure.

Referring to FIG. 1, a controller 102 is communicatively connected to a surround view monitoring (SVM) camera 122, a dead reckoning (DR) sensor 124, a map database 126, a distance sensor 128, a vehicle speed sensor **13*o*, an illuminance sensor 132, a parking assistance system 134, a user interface 136, an audio, video and navigation (AVN) 152, and a hydraulic driver 154**.

The surround view monitoring camera 122 may be a plurality of cameras provided to photograph surroundings of a vehicle 100. The surround view monitoring cameras 122 may be provided with one camera on front, rear, left, and right sides of the vehicle 100, respectively. The left camera may be installed in a left outside mirror, and the right camera may be installed in a right outside mirror. The surround view monitoring cameras 122 are also referred to as around view monitoring cameras. The controller 102 may identify whether a boundary stone (also referred to as a curb) exists in the surroundings of the vehicle 100 through an image captured by the surround view monitoring cameras 122.

The dead reckoning sensor 124 is provided to detect a heading direction of the vehicle 100. The controller 102 may detect the heading direction of the vehicle 100 through the dead reckoning sensor 124 and compare road information of the map database 126 with the heading direction to identify whether the heading direction of the vehicle 100 matches a road direction.

The map database 126 is provided to store map information to support a navigation function of the AVN 152. As described above, the controller 102 may utilize the map information of the map database 126 to identify whether the heading direction of the vehicle 100 matches the road direction.

A plurality of distance sensors 128 are installed on a side of the vehicle 100. The distance sensors 128 are provided to measure a distance to an object placed on the side of the vehicle 100. For example, if a boundary stone exists at the side of the vehicle 100, the distance from the side of the vehicle 100 to the boundary stone may be measured by the distance sensors 128. One of the distance sensors 128 may be provided on the right side of each of front and rear bumpers of the vehicle 100, and one or two of the distance sensors 128 may be provided on a lower side of the door between a front wheel and a rear wheel. The distance sensor 128 may be an ultrasonic sensor. To measure a distance to a low-height boundary stone located on the side of the vehicle 100, the distance sensors 128 are preferably installed at a low position if possible.

Furthermore, when it is difficult to install the distance sensor 128 at a sufficiently low position on the side of the vehicle 100 due to a structural limitation of the vehicle 100, the distance sensor 128 may be installed at a higher position. However, in this case, it is preferable to allow the distance sensor to measure a structure in a low position, such as a boundary stone (curb) on a roadside by installing such that a direction for measuring the distance of the distance sensor 128 has a directivity that is directed downward more than an installation height of the distance sensor. Furthermore, based on a lateral direction of the vehicle 100, since the distance sensor 128 is installed more inside than a side surface of a tire (see 212 of FIG. 2 to be described later), application of a correction value to correct the error between the distance sensor 128 and the side surface of the tire 212 is required. Through such correction, the distance between the side surface of the tire 212 and the boundary stone may be accurately measured.

The vehicle speed sensor 130 is provided to measure the speed of the vehicle 100. In an exemplary embodiment of the disclosure, when the vehicle 100 is in a stationary state, that is, when the vehicle speed is 0 km/h, a wheel protection parking mode is switched. The controller 102 may determine whether the vehicle 100 is in the stationary state (0 km/h) through the vehicle speed sensor 130.

The illuminance sensor 132 is provided to detect illuminance (brightness) around the vehicle 100. In an exemplary embodiment of the disclosure, the surroundings of the vehicle 100 are captured through the surround view monitoring cameras 122, and a boundary stone is identified through analysis of the captured one or more images. However, if the surroundings of the vehicle 100 are too dark to accurately identify the boundary stone through image analysis, it is desirable that the illuminance sensor 132 detects the illuminance around the vehicle 100 and then performs photographing at a predetermined illuminance or higher.

The parking assistance system 134 is provided to automatically park the vehicle 100 without a driver's intervention. To this end, the parking assistance system 134 obtains control rights of an engine, a transmission, and a steering wheel in a parking assistance control mode, and controls the vehicle 100 so that the vehicle 100 is parked at a target location with reference to information on surrounding situations provided from the surround view monitoring cameras 122 and the distance sensor 128, and the like.

The user interface 136 is provided to receive a setting (input) of a user. The user interface 136 may be a graphical user interface displayed on a display of the AVN 152. Alternatively, the user interface 136 may be provided in the form of a button or a dial in the vehicle 100. The user may select (activate) the wheel protection parking mode through the user interface 136 or select (activate) the parking assistance control mode through the user interface 136.

The AVN (also referred to as a multimedia device) 152 is configured to provide an audio/video/navigation function. The map database 126 and the user interface 136 described above may be provided through the AVN 152.

The hydraulic driver 154 is provided on the wheel of the vehicle 100 according to an embodiment of the disclosure so that the width of the wheel may be variably controlled. Variable control of the width of the wheel by action of the hydraulic driver 154 will be described in more detail with reference to FIG. 2 to be described later.

The controller 102 controls variably the width of the wheels 214 and 216 to be narrowed by generating a control signal and driving the hydraulic driver 154 in order to prevent the wheels (see 214 and 216 of FIG. 2) of the vehicle 100 from being damaged by contact with a roadside boundary stone in a parallel parking situation of the vehicle 100.

Figure 2:
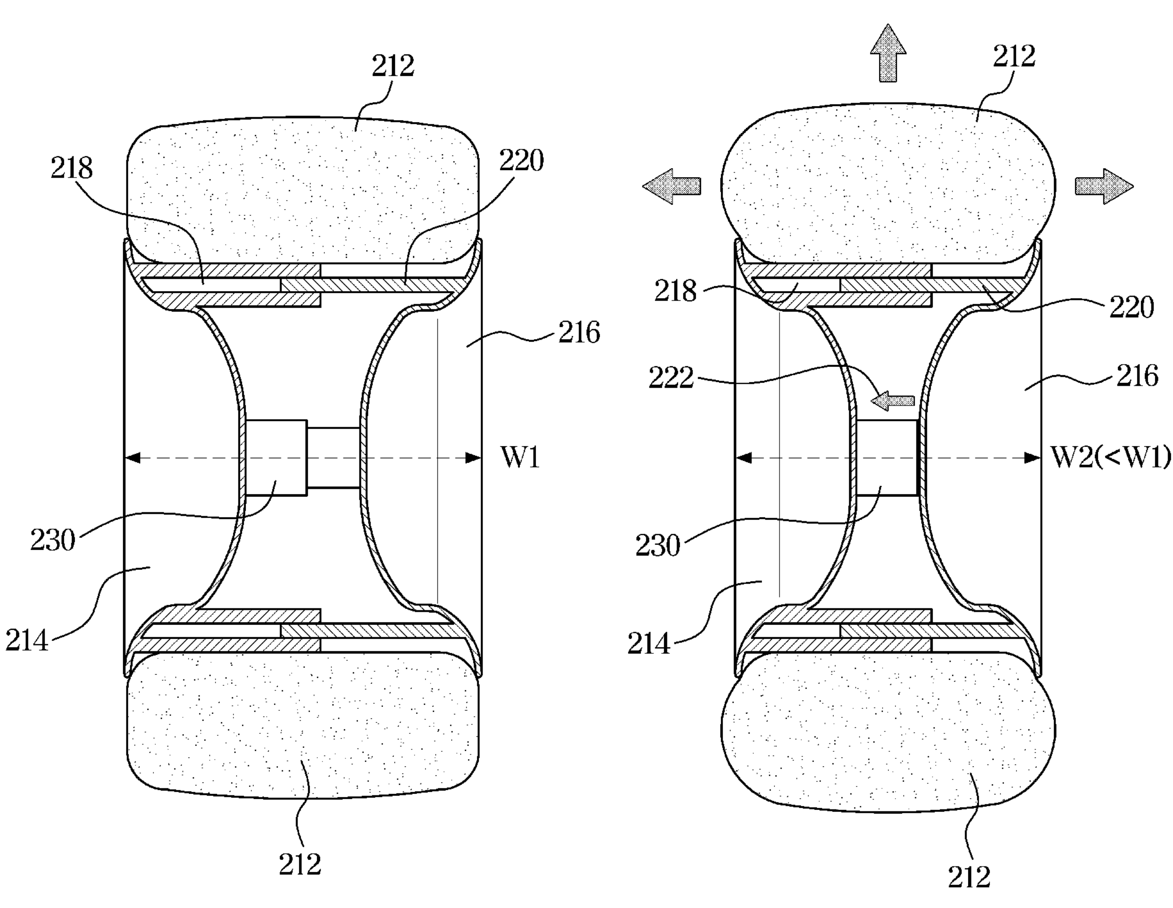
FIG. 2 is a view illustrating a wheel structure of a vehicle according to an embodiment of the disclosure.

FIG. 2 is a view illustrating a wheel structure of a vehicle according to an embodiment of the disclosure. A wheel refers to a ring-shaped object connected to an axle (rotation shaft) of a vehicle for rotation. A form in which a metal wheel is combined with a rubber tire is also called a wheel. In an embodiment of the disclosure, a metal wheel connected to a drive shaft of the vehicle 100 and a rubber tire coupled thereto are divided into the wheels 214 and 216 and the tire 212, respectively, and reference numerals are denoted thereto.

The wheels 214 and 216 according to an embodiment of the disclosure are mechanically connected to the axle (rotation shaft) of the vehicle 100 to rotate. The tire 212 made of rubber is mounted on a circumference of the wheels 214 and 216.

As shown in FIG. 2, the wheels 214 and 216 according to an embodiment of the disclosure include an inner wheel (a first wheel) 214 and an outer wheel (a second wheel) 216. Here, based on a state in which the wheels 214 and 216 are mounted on the vehicle 100, a wheel close to a vehicle body of the vehicle 100 is referred to as the inner wheel 214 and a wheel away from the vehicle body (a wheel exposed to the outside) is referred to as the outer wheel 216. In other words, based on a state in which the wheels 214 and 216 are mounted on the vehicle 100, a wheel positioned inside a wheel house of the vehicle 100 is the inner wheel 214, and a wheel exposed to the outside of the wheel house of the vehicle 100 is the outer wheel 216.

The inner and outer wheels 214 and 216 constituting the wheels 214 and 216 according to an embodiment of the disclosure are configured as separate ones and are mechanically coupled through coupling members 218 and 220 provided on each of the inner wheel 214 and the outer wheel 216. However, instead of the inner wheel 214 and the outer wheel 216 not being fixed to each other, the outer wheel 216 may move in a direction of the inner wheel 218 along a width direction of the wheels 214 and 216 (a direction of arrow 222 in FIG. 2) in a sliding manner through each of the coupling members 218 and 220. As such, the overall width of the wheels 214 and 216 may be varied by movement of the outer wheel 216. The hydraulic driver 230 is provided between the inner wheel 214 and the outer wheel 216. The hydraulic driver 230 generates power in response to a control of the controller 120, and the power generated causes the outer wheel 216 to move along the direction of the inner wheel 214 (direction of arrow 222). Because the inner wheel 214 is mechanically coupled to the wheel of the vehicle 100 and thus cannot move in the width direction thereof, it is preferable that only the outer wheel 216 moves in the direction of the inner wheel 214. At this time, the tire 212 may expand in an outward direction of the wheels 214 and 216 within a range that the tire 212 may tolerate as the width of the wheels 214 and 216 is reduced.

Referential numeral 210 in FIG. 2 shows a basic mode of the wheels 214 and 216 according to an embodiment of the disclosure. Reference numeral 250 of FIG. 2 shows a wheel protection parking mode of the wheels 214 and 216 according to an embodiment of the disclosure. Comparing a width W1 of the wheels 214 and 216 in 210 of FIG. 2 with a width W2 of the wheels 214 and 216 in 250 of FIG. 2, the width W2 of the wheels 214 and 216 in 210 of FIG. 2 is narrower than the width W1 of the wheels 214 and 216 in 250 of FIG. 2 (W2<W1). In other words, when the vehicle 100 is in the wheel protection parking mode, the controller 102 generates a control signal to drive the hydraulic driver 230, and power is generated by driving the hydraulic driver 230. As a result, as the outer wheel 216 moves in the direction of the inner wheel 214 by the power generated, the overall width of the wheels 214 and 216 may be reduced from the W1 in 210 of FIG. 2 to the W2 in 250 of FIG. 2.

As such, in the wheel protection parking mode, the overall width of the wheels 214 and 216 is reduced such that an outer surface of the outer wheel 216 enters more inward than a side surface of the tire 212, thereby preventing damage of the outer wheel 216 from contacting with a structure located on the side of the vehicle 100 when the vehicle 100 is parked horizontally.

Figure 3A:
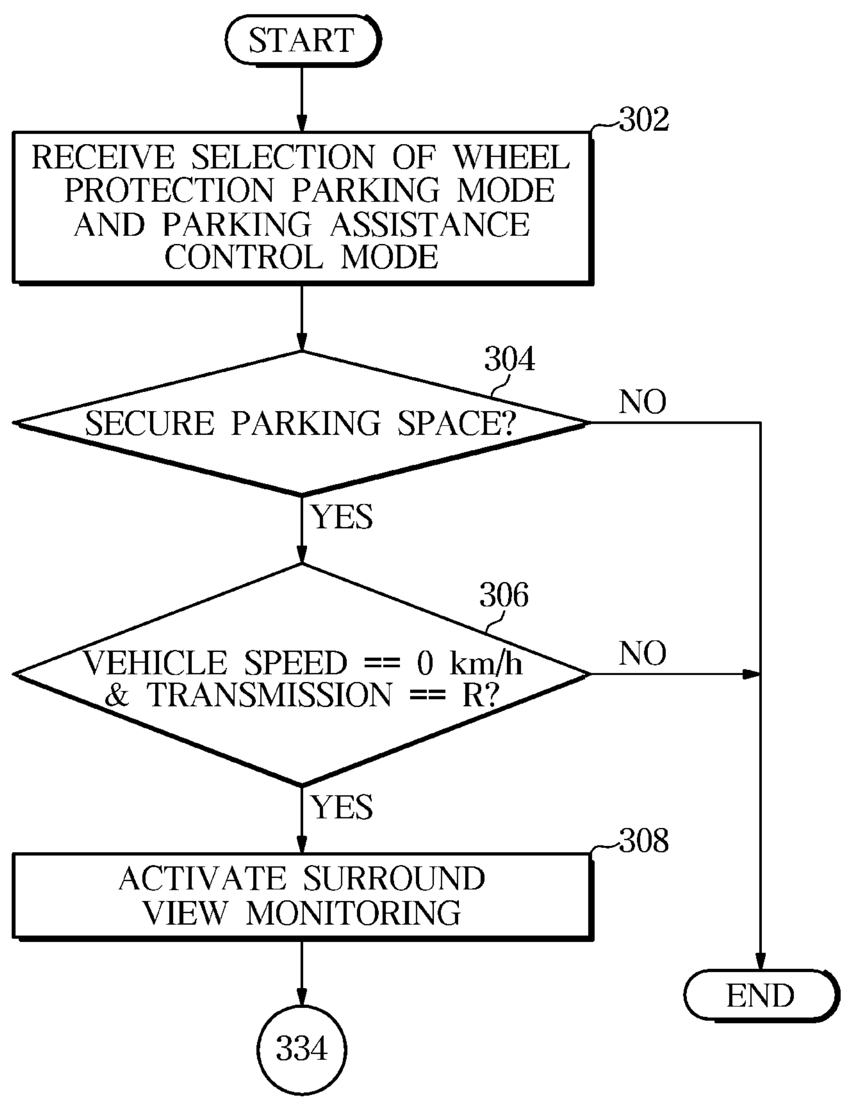
FIGS. 3A and 3B are views illustrating a method of controlling parking of a vehicle according to an embodiment of the disclosure.
Figure 3B:
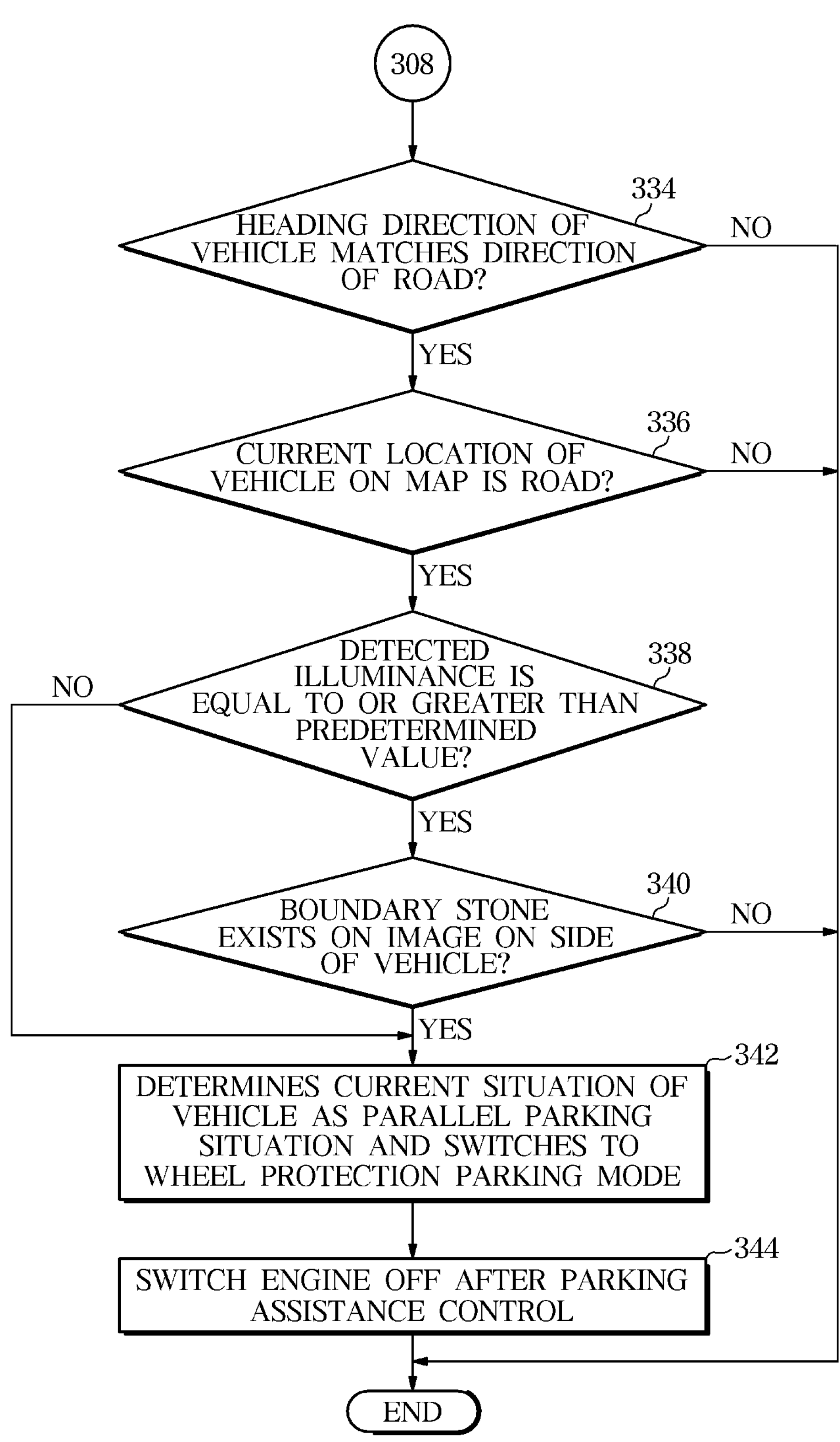

FIGS. 3A and 3B are views illustrating a method of controlling parking of a vehicle according to an embodiment of the disclosure.

As shown in FIG. 3A, the controller 102 receives a selection of a wheel protection parking mode and a parking assistance control mode from a user through the user interface 136 (302). In other words, when the user selects the wheel protection parking mode and the parking assistance control mode through a manipulation of the user interface 136, the controller 102 receives the selection and then activates the wheel protection parking mode and the parking assistance control mode of the vehicle 100.

Figure 4:
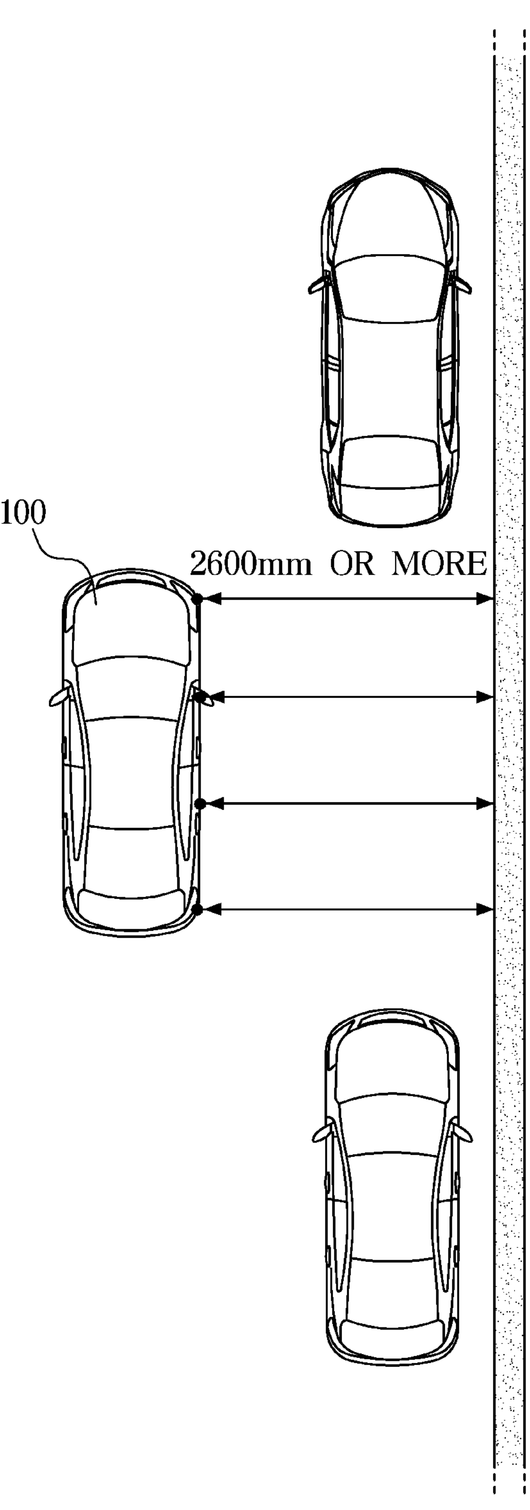
FIG. 4 is a view illustrating securing a parking space in a parking assistance control according to an embodiment of the disclosure.

In response to activation of the wheel protection parking mode and the parking assistance control mode, the controller 102 first identifies whether a parking space (or area) of a certain size or more is secured around the vehicle 100 for the parking assistance control (304). FIG. 4 is a view illustrating securing a parking space in the parking assistance control according to an embodiment of the disclosure. As shown in FIG. 4, the controller 102 may identify the parking space through all of the plurality of distance sensors 128 installed on the side of the vehicle 100. The controller 102 may determine that the parking space is secured when an area of a predetermined distance (e.g., 2,600 mm) or more is secured on the side of the vehicle 100. Here, the predetermined distance is a distance sufficient for the vehicle 100 to park, and may be a distance determined in consideration of a vehicle width and a turning radius of the vehicle 100.

Returning to FIG. 3A, the controller 102 identifies whether the vehicle speed of the vehicle 100 is 0 km/h and the transmission of the vehicle 100 is R (reverse) (306). Identification of the vehicle speed being 0 km/h is to determine whether the vehicle 100 is in a stationary state. Identification of the transmission of the vehicle 100 being R (reverse) is to determine whether the vehicle 100 is in a situation in which reverse is available because the parking of the vehicle 100 is mainly performed in reverse parking.

If the vehicle speed of the vehicle 100 is 0 km/h and the transmission of the vehicle 100 is R (reverse) (YES in 306), the controller 102 activates the surround view monitoring function (308). When the surround view monitoring function is activated, the surround view monitoring cameras 122 operate to capture images around the vehicle 100.

In an embodiment of the disclosure, when the parking assistance control is performed in a parallel parking condition of the vehicle 100, by utilizing the structure of the wheels 214 and 216 described above with reference to FIG. 2, the controller 102 performs the parking assistance control by switching to the wheel protection parking mode that allows parking without damage to the outer wheel 216. To this end, the controller 102 identifies whether the parallel parking condition is satisfied through a series of processes shown in 334 to 340 of FIG. 3B to be described below.

As shown in FIG. 3B, the controller 102 identifies whether the heading direction of the vehicle 100 matches the direction of the road from the image captured by the surround view monitoring cameras 122 (334). However, this case is limited to a case where the vehicle 100 is located on a road rather than a parking lot. Whether a current location of the vehicle 100 is a parking lot or on a road may be identified through the navigation function of the AVN 152.

Furthermore, in response to the direction of the vehicle 100 matching the direction of the road (YES in 334), the controller 102 identifies whether the current location of the vehicle 100 on the map is on the road through the navigation function (336). In other words, in addition to identifying through the surround view monitoring cameras 122, the controller identifies once more whether the vehicle 100 is located on the road through the navigation function.

In response to the direction of the vehicle 100 matching the direction of the road (YES in 334) and the current location of the vehicle 100 on the navigation map being on the road (YES in 336), the controller 102 determines that the parking environment of the vehicle 100 is the parallel parking environment. In other words, on a road not a parking lot, parallel parking, which is parking in the same direction as the road, is common in a condition in which the directions of the vehicle 100 and the road are parallel to each other.

Next, the controller 102 detects the illuminance around the vehicle 100 through the illuminance sensor 132 and identifies whether the detected illuminance is equal to or greater than a predetermined value (338). In response to the detected illuminance being equal to or greater than the predetermined value (YES in 338), the controller identifies whether a structure (e.g., a boundary stone) exists on the side of the vehicle 100 from an image of certain areas on the side of the vehicle 100 captured through the surround view monitoring cameras 122 (340). However, when the illuminance around the vehicle 100 is not sufficient, the verification result of the boundary stone through image analysis may not be trusted. Therefore, the controller identifies the boundary stone through image analysis only when sufficient illuminance (illuminance greater than the predetermined value) is secured to identify the presence and color of the boundary stone.

In other words, in FIG. 3B, in response to the detected illuminance being less than the predetermined value (if the illuminance is insufficient) (NO in 338), the controller 102 skips the boundary stone identification of operation 340 through image analysis and proceeds to operation 342. Conversely, in response to the detected illuminance being equal to or greater than the predetermined value (if the illuminance is sufficient) (YES in 338), the controller 102 identifies whether a boundary stone exists on the side of the vehicle 100 through image analysis (340). The process will be described with reference to FIG. 5 as follows.

Figure 5:
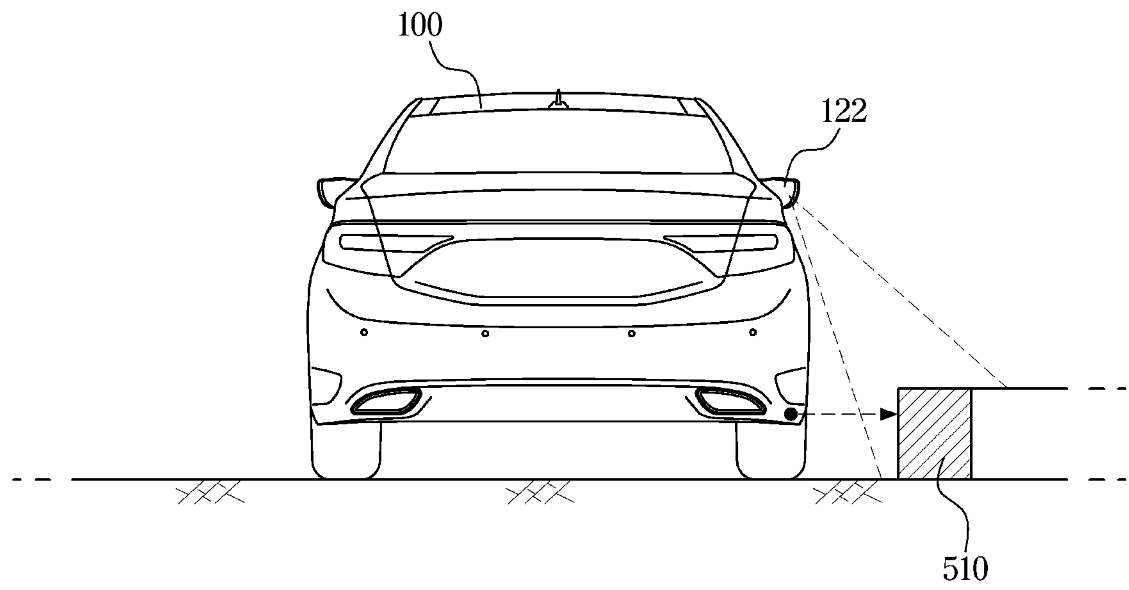
FIG. 5 is a view illustrating a boundary stone identification by image analysis of a vehicle according to an embodiment of the disclosure.

FIG. 5 is a view illustrating a boundary stone identification through image analysis of a vehicle according to an embodiment of the disclosure. As shown in FIG. 5, the controller 102 uses the surround view monitoring camera 122 mounted on the right outside mirror (based on driving on the right side) among the surround view monitoring cameras 122 provided in the vehicle 100 to capture the image of a certain area on the right side of the vehicle (based on driving on the right side). The controller 102 analyzes the captured image and identifies whether a low-height structure such as the boundary stone 510 exists in a predetermined area of the side of the vehicle 100. The color of the boundary stone (curb) may be different depending on the location and use. For example, a boundary stone made of natural stone may be light gray. In this case, RGB values of the boundary stone in the image may be approximately R (185-205), G (185-205), and B (190-210). The boundary stone made of concrete may be dark gray. In this case, the RGB values of the boundary stone in the image may be approximately R (130-150), G (125-145), and B (110-130). In addition, there may be a boundary stone painted yellow or red for warning purposes (other colors are also available). For yellow, the RGB values of the boundary stone in the image may be approximately R (235-255), G (210-230), and B (55-75) For red, the RGB values of the boundary stone in the image may be approximately R (195-215), G (40-60), and B (60-80). The controller 102 may identify the boundary stone through the RGB values and a long shape thereof in the image.

Returning to FIG. 3B, in response to all the conditions of operations 334 and 336 being satisfied as described above, the controller 102 determines that the current situation of the vehicle 100 is the parallel parking situation of a roadside. In addition to this, if the condition of operation 340 is further satisfied, the controller 102 may identify more precisely that the current situation of the vehicle 100 is the parallel parking situation of the roadside. In such situations, the controller 102 determines the current situation of the vehicle 100 as the parallel parking situation and switches the vehicle 100 to the wheel protection parking mode (342). As the vehicle 100 is switched to the wheel protection parking mode, the controller 102 drives the hydraulic drivers 230 of each of the right front and right rear wheels of the vehicle 100 to move the outer wheel 216 toward the inner wheel 214 (see 250 in FIG. 2). As a result, the distance between the inner wheel 214 and the outer wheel 216 (i.e., the width of the wheels 214 and 216) is narrowed, so that damage to the outer wheel 216 due to contact with the boundary stone may be prevented.

When the vehicle 100 is switched to the wheel protection parking mode and variable control of the width of the wheels 214 and 216 is performed, the controller 102 parks the vehicle 100 in the parking area of the roadside through the parking assistance control and then the engine of the vehicle 100 is switched off (344). However, before the engine is switched off, the controller 102 converts the wheels 214 and 216 to the original basic mode (210 in FIG. 2). The parking assistance control of the vehicle 100 will be described in detail with reference to FIGS. 6A to 6F below.

FIGS. 6A to 6F are views illustrating the parking assistance control of a vehicle according to an embodiment of the disclosure. The distance, direction, and angle mentioned in the following description may vary according to specifications (e.g., size and turning radius, etc.) of the vehicle 100.

Figure 6A:
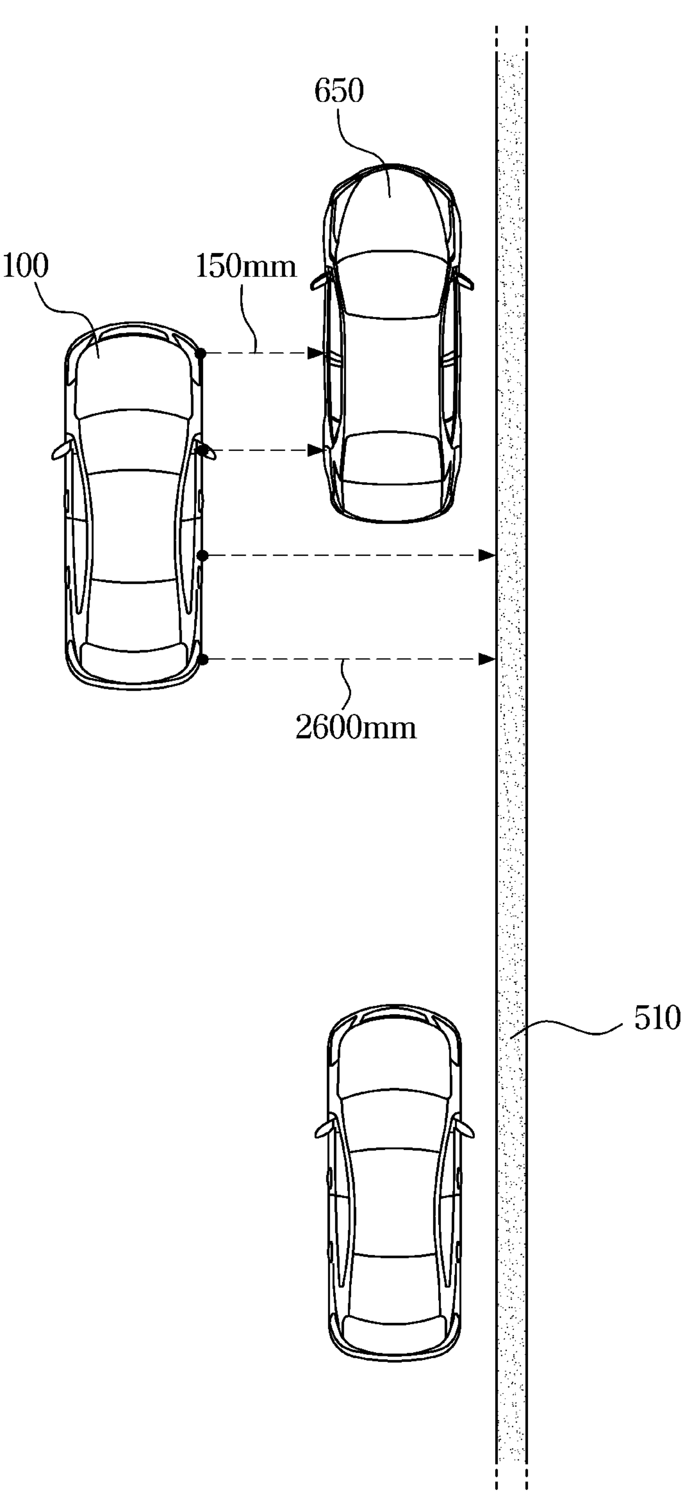
FIGS. 6A to 6F are views illustrating a parking assistance control of a vehicle according to an embodiment of the disclosure.

As shown in FIG. 6A, in the state where the parking space is secured as illustrated in FIG. 4 described above, the controller 102 moves the vehicle 100 so that the distance between one side of the front of the vehicle 100 and the other vehicle 650 ahead is approximately 150 mm.

Figure 6B:
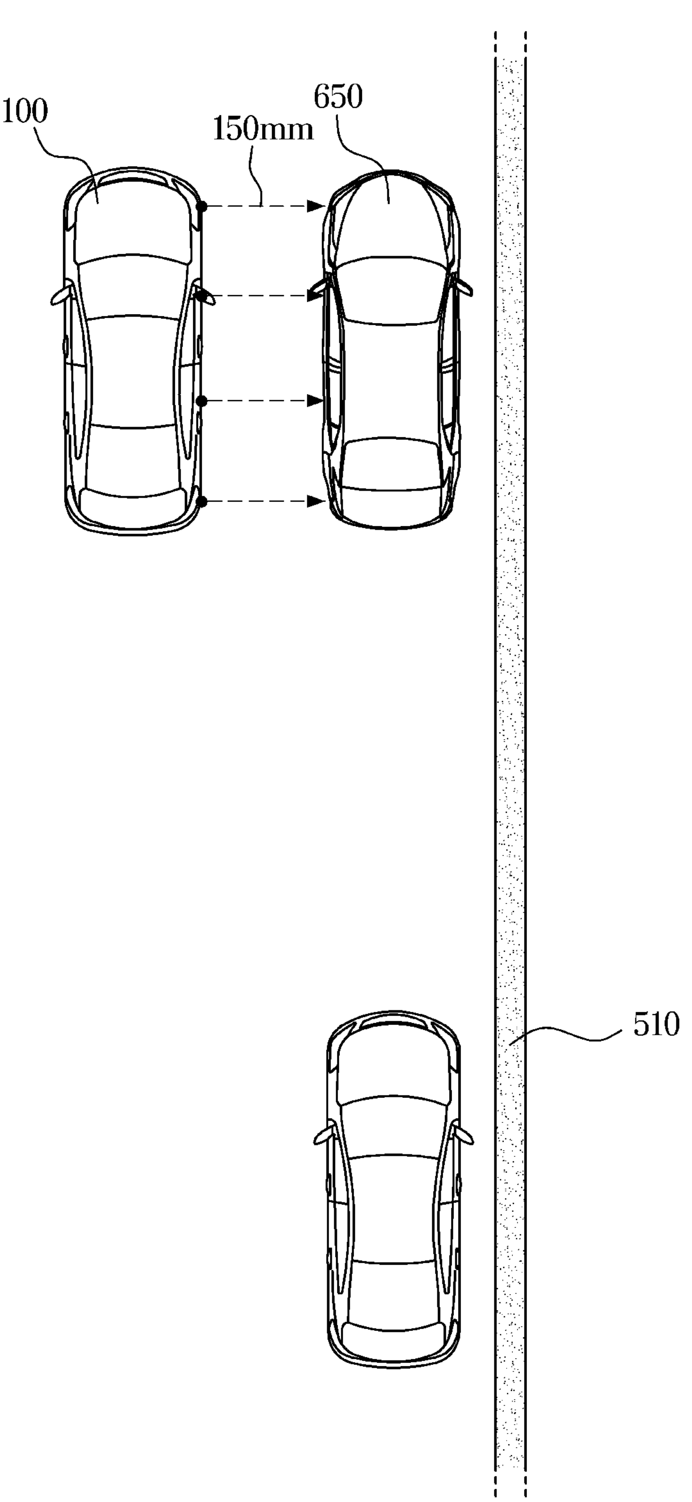

In response to the distance between the vehicle 100 and the other vehicle 650 exceeding 150 mm, as shown in FIG. 6B, the controller 102 make the distance between the vehicle 100 and the other vehicle 650 measured through all of the distance sensors 128 of the vehicle 100 is approximately 150 mm while repeating forward and backward movements of the vehicle 100.

Figure 6C:
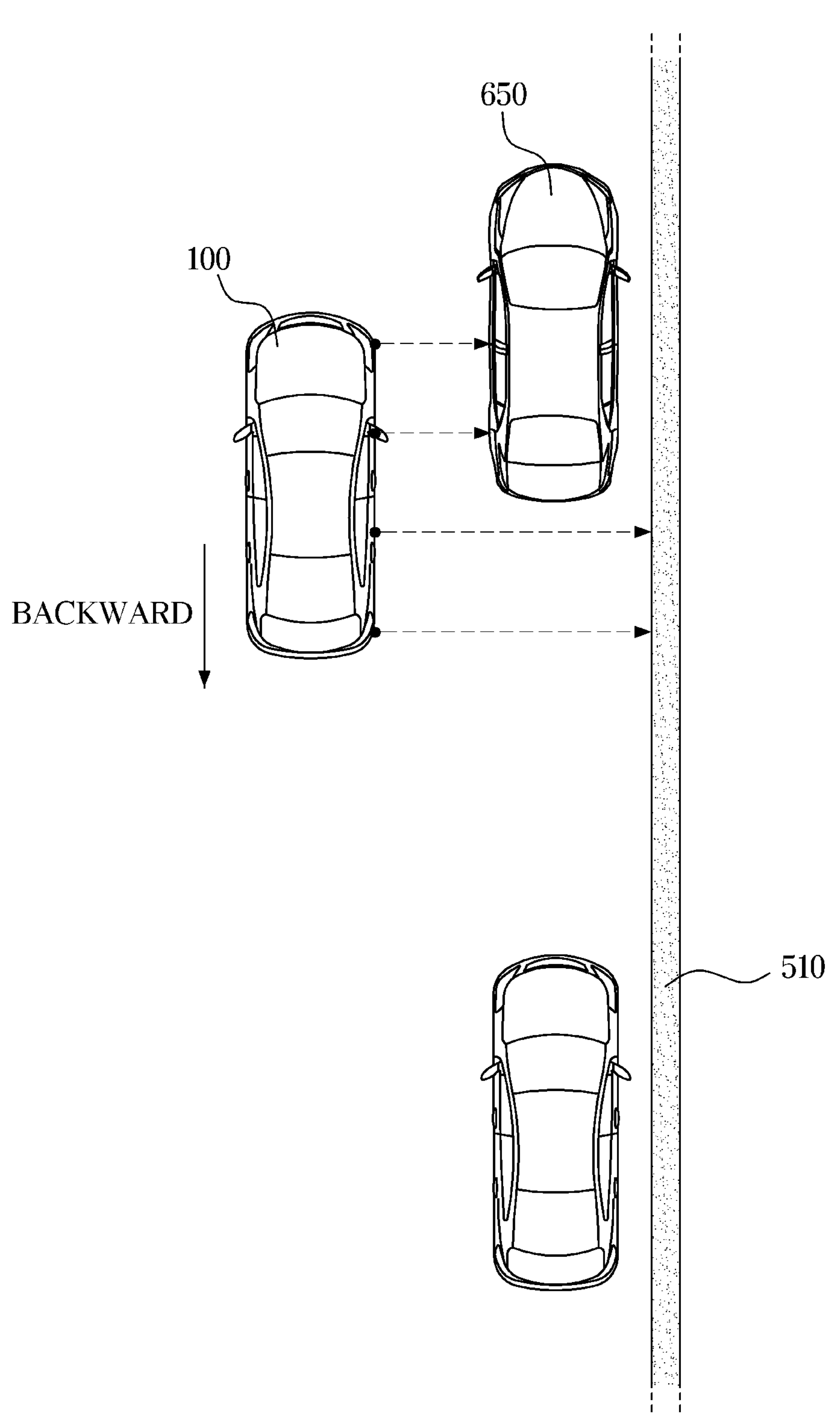

When the state of FIG. 6B is secured, the controller 102 reverses the vehicle 100 as shown in FIG. 6C.

Figure 6D:
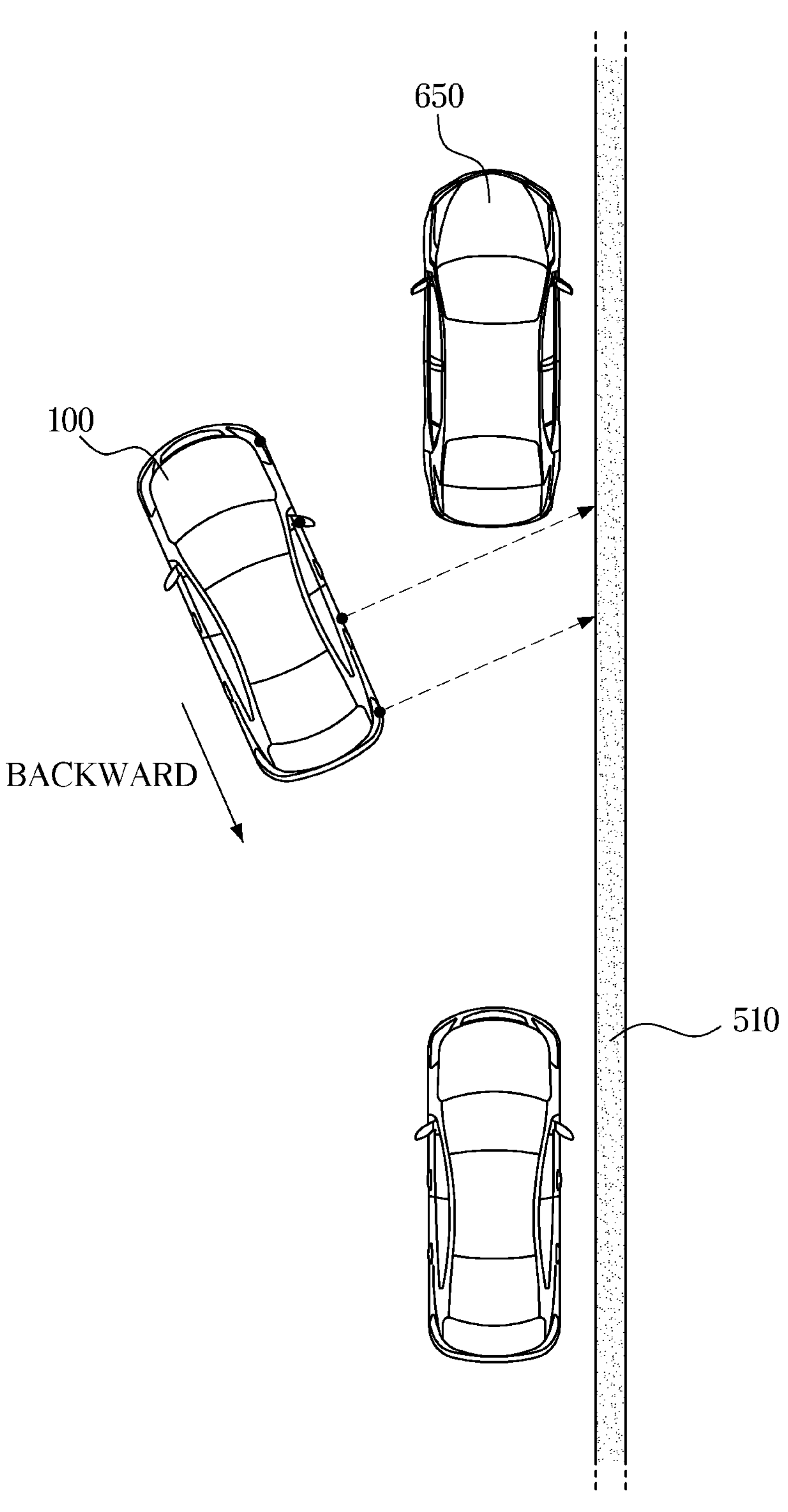

As shown in FIG. 6D, the controller 102 changes the driving direction of the vehicle 100 toward the boundary stone 510 and continues backward.

Figure 6E:
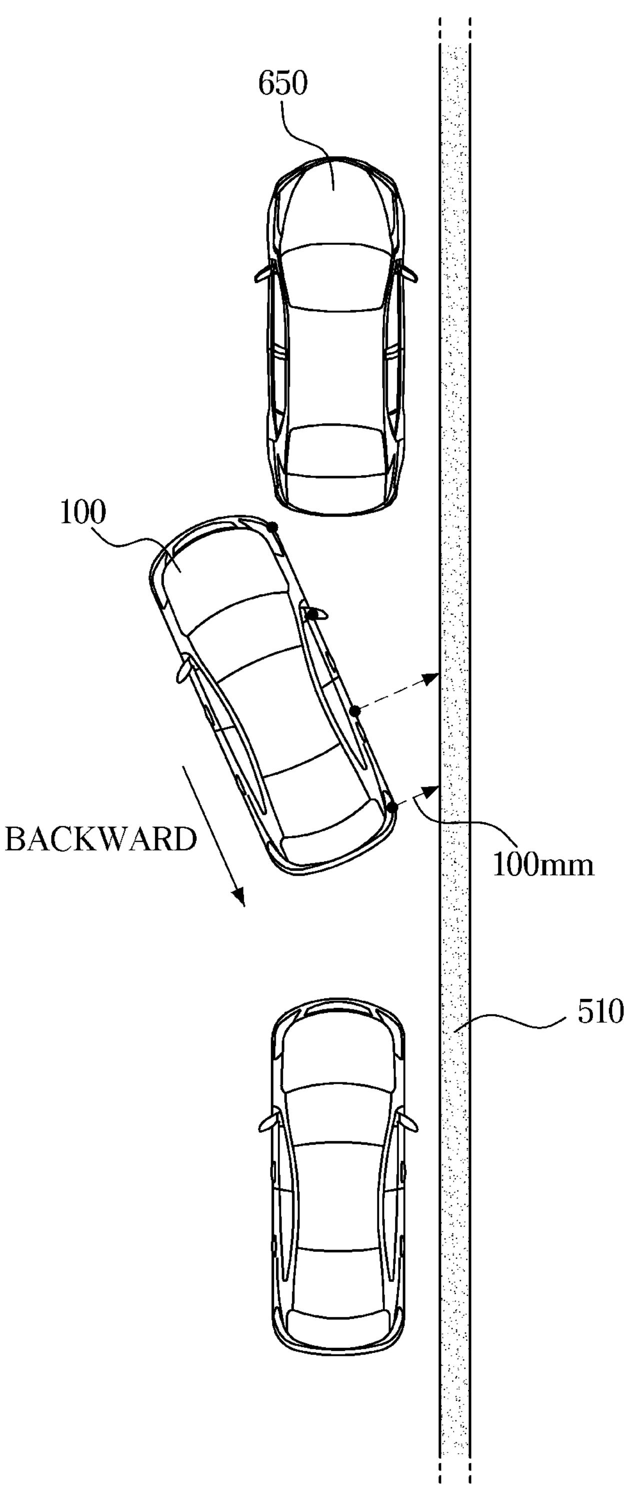

The controller 102 continues to reverse the vehicle 100, as shown in FIG. 6E, until the rear side of the vehicle 100 is approximately 100 mm from the boundary stone 510.

Figure 6F:
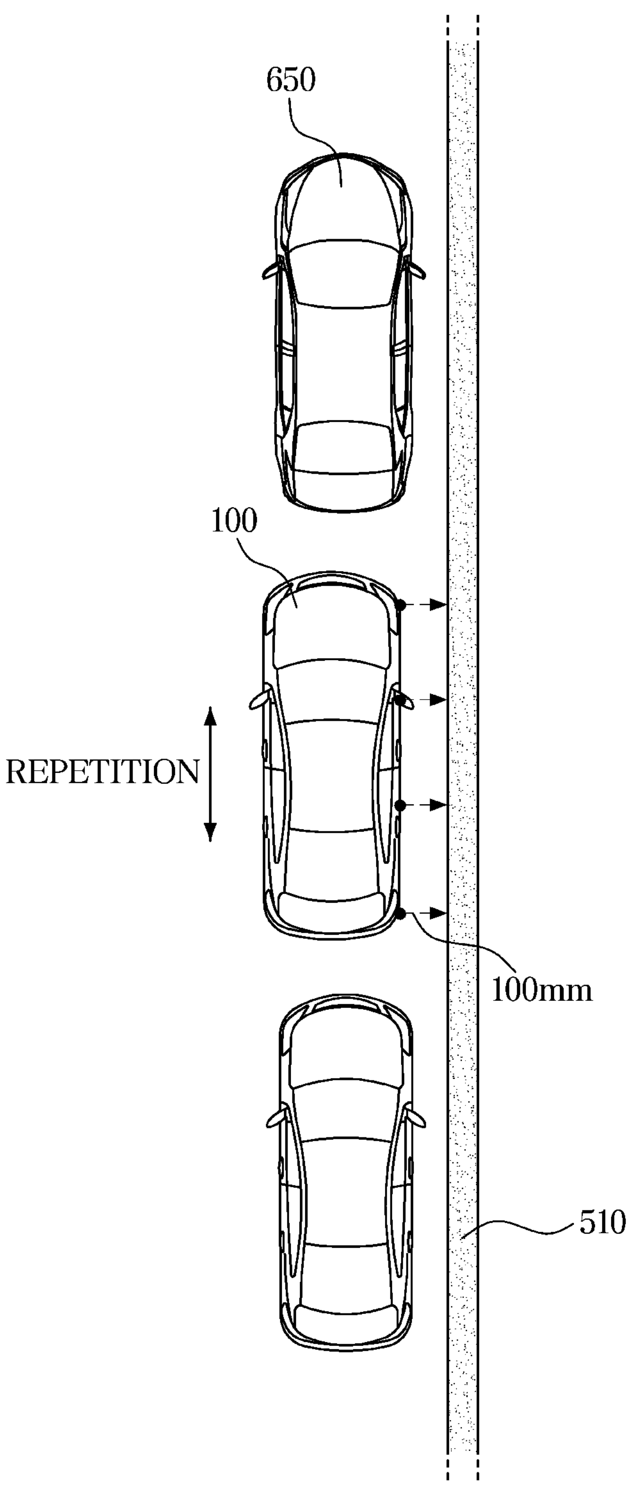

Next, the controller 102 repeats the forward and backward movement of the vehicle 100 so that the vehicle 100 is in the state as shown in FIG. 6F, and the distance between the side surface of the vehicle 100 and the boundary stone 510 is maintained at approximately 100 mm.

As is apparent from the above, embodiments of the disclosure may provide a vehicle capable of preventing damages due to contact between a roadside structure and a wheel by varying the width of the wheel, in particular by varying so as to decrease the width of the wheel in parallel parking conditions, and a method of controlling the same.

On the other hand, the exemplary embodiments of the disclosure may be embodied in the form of a recording medium storing instructions executable by a computer. The instructions may be stored in the form of program code and, when executed by a processor, may generate a program module to perform the operations of the exemplary embodiments. The recording medium may be embodied as a non-transitory computer-readable recording medium.

The non-transitory computer-readable recording medium includes all types of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle comprising:

a wheel having a width that is changeable, the wheel comprising an inner wheel connected to an axle of the vehicle and an outer wheel connected to the inner wheel;

a tire attached to the wheel;

a driver interposed between the inner wheel and the outer wheel; and a controller configured to generate a control signal for changing the width of the wheel, wherein:

the driver is configured to move the outer wheel along a longitudinal direction of the axle of the vehicle to decrease the width of the wheel by generating power in response to the control signal, and the driver is configured to move the outer wheel to a position where, as a result of a decrease in the width of the wheel, the tire is deformed such that an outer surface of the outer wheel is located inboard of a side surface of the tire, thereby allowing the tire to prevent damage of the outer wheel.

2. The vehicle of claim 1, further comprising:

a first coupling member provided on the inner wheel; and a second coupling member provided on the outer wheel, wherein:

the inner wheel and the outer wheel are coupled to each other through the first coupling member and the second coupling member, and the outer wheel is configured to move along the longitudinal direction of the axle of the vehicle through the first coupling member and the second coupling member.

3. The vehicle of claim 1, wherein the driver comprises a hydraulic driver configured to generate the power in a hydraulic manner.

4. The vehicle of claim 1, further comprising:

a distance sensor installed on a side of the vehicle and configured to detect a distance between the vehicle and a structure present in a side direction of the vehicle, wherein the controller is further configured to generate the control signal to decrease the width of the wheel to prevent contact between the structure and the wheel.

5. The vehicle of claim 4, wherein a plurality of distance sensors are installed on the side of the vehicle.

6. The vehicle of claim 4, wherein the distance sensor is installed at a lower side of a vehicle door that is located between a front wheel and a rear wheel of the vehicle.

7. The vehicle of claim 4, wherein the distance sensor is installed such that a direction for measuring the distance is angled downward relative to an installation height of the distance sensor.

8. The vehicle of claim 5, further comprising:

a first coupling member provided on the inner wheel; and a second coupling member provided on the outer wheel, wherein:

the inner wheel and the outer wheel are coupled to each other through the first coupling member and the second coupling member, and the outer wheel is configured to move along the longitudinal direction of the axle of the vehicle through the first coupling member and the second coupling member.

9. The vehicle of claim 4, wherein the driver comprises a hydraulic driver configured to generate the power in a hydraulic manner.

10. A method of controlling a vehicle, the vehicle comprising a wheel having a width that is changeable, a tire attached to the wheel, and a controller that generates a control signal for changing the width of the wheel, wherein the wheel comprises an inner wheel connected to an axle of the vehicle, an outer wheel connected to the inner wheel, and a driver interposed between the inner wheel and the outer wheel that varies the width of the wheel by generating power in response to the control signal so that the outer wheel moves along a longitudinal direction of the axle of the vehicle, wherein the driver is configured to move the outer wheel to a position where, as a result of a decrease in the width of the wheel, the tire is deformed such that an outer surface of the outer wheel is located inboard of a side surface of the tire, thereby allowing the tire to prevent damage of the outer wheel, the method comprising:

determining that a condition for changing the width of the wheel is satisfied; and generating the control signal in response to the condition for varying the width of the wheel being satisfied.

11. A method of controlling a vehicle, the vehicle comprising a wheel having a width that is changeable, a tire attached to the wheel, and a controller that generates a control signal for changing the width of the wheel, wherein the wheel comprises an inner wheel connected to an axle of the vehicle, an outer wheel connected to the inner wheel, and a driver interposed between the inner wheel and the outer wheel that changes the width of the wheel by generating power in response to the control signal such that the outer wheel moves along a longitudinal direction of the axle of the vehicle, wherein the driver is configured to move the outer wheel to a position where, as a result of a decrease in the width of the wheel, the tire is deformed such that an outer surface of the outer wheel is located inboard of a side surface of the tire, thereby allowing the tire to prevent damage of the outer wheel, the method comprising:

determining that the vehicle is in a parallel parking situation; and generating the control signal such that the width of the wheel decreases in response to the vehicle being in the parallel parking situation.

12. The method of claim 11, wherein the parallel parking situation comprises parking the vehicle in parallel on a roadside.

13. The method of claim 12, wherein the vehicle is determined to be in the parallel parking situation based on the vehicle being in a stationary state and a direction of the vehicle matching a direction of a road on which the vehicle is located.

14. The method of claim 12, wherein the vehicle is determined to be in the parallel parking situation based on the vehicle being in a stationary state and a location of the vehicle being on a road in a navigation of the vehicle.

15. The method of claim 12, wherein the vehicle is determined to be in the parallel parking situation based on the vehicle being in a stationary state and a boundary stone separating a road and a sidewalk being detected in an image of a predetermined area at a side of the vehicle.

16. The method of claim 11, wherein generating the control signal comprises generating the control signal such that the width of the wheel decreases so that the width of the wheel is less than a width of the tire.

17. The vehicle of claim 1, wherein the controller is configured to generate the control signal to decrease the width of the wheel so that the width of the wheel is less than a width of the tire.

18. The vehicle of claim 1, wherein outer edges of the inner wheel and the outer wheel are configured to pressurize a portion of the tire in response to the change in the width of the wheel.

19. The vehicle of claim 1, wherein the controller is configured to generate the control signal in response to determining that the vehicle is in a parallel parking situation.

20. The method of claim 11, wherein outer edges of the inner wheel and the outer wheel are configured to pressurize a portion of the tire in response to the change in the width of the wheel.

* * * * *